United States Patent
Volp

(10) Patent No.: US 7,624,261 B2
(45) Date of Patent: Nov. 24, 2009

(54) SECURE BOOTING OF AN ELECTRONIC APPARATUS WITH SMP ARCHITECTURE

(75) Inventor: Marcus Volp, Karlsruhe (DE)

(73) Assignee: STMicroelectronics S.A., Montrouge (FR)

( * ) Notice: Subject to any disclaimer, the term of this patent is extended or adjusted under 35 U.S.C. 154(b) by 407 days.

(21) Appl. No.: 11/432,727

(22) Filed: May 11, 2006

(65) Prior Publication Data

US 2007/0113088 A1    May 17, 2007

Related U.S. Application Data

(63) Continuation of application No. PCT/FR2004/002897, filed on Nov. 10, 2004.

(30) Foreign Application Priority Data

Nov. 13, 2003    (FR) .................................. 03 13305

(51) Int. Cl.
*G06F 9/00* (2006.01)
*G06F 9/24* (2006.01)
*H04N 7/16* (2006.01)

(52) U.S. Cl. .................. 713/2; 713/1; 726/26

(58) Field of Classification Search ............... 713/2
See application file for complete search history.

(56) References Cited

U.S. PATENT DOCUMENTS

| | | | |
|---|---|---|---|
| 4,799,635 A * | 1/1989 | Nakagawa | 711/115 |
| 5,288,978 A * | 2/1994 | Iijima | 235/380 |
| 5,506,580 A | 4/1996 | Whiting et al. | |
| 5,904,733 A | 5/1999 | Jayakumar | |
| 5,961,642 A | 10/1999 | Lewis | |
| 5,983,335 A | 11/1999 | Dwyer, III | |
| 6,012,142 A | 1/2000 | Dokic et al. | |
| 6,158,000 A * | 12/2000 | Collins | 713/1 |
| 6,263,431 B1 | 7/2001 | Lovelace et al. | |
| 6,294,953 B1 | 9/2001 | Steeves | |
| 6,347,372 B1 | 2/2002 | Takashima et al. | |
| 6,400,717 B1 | 6/2002 | Von Ahnen et al. | |

(Continued)

FOREIGN PATENT DOCUMENTS

FR    2809204    11/2001

(Continued)

OTHER PUBLICATIONS

Menezes, et al., Handbook of Applied Cryptography, Series on Discrete Mathematices and Its Applications, CRC Press, Boca Raton, FL, 1997, pp. 400-405.

(Continued)

*Primary Examiner*—Suresh K Suryawanshi
(74) *Attorney, Agent, or Firm*—Lisa K. Jorgenson; Robert Iannucci; Seed IP Law Group

(57) ABSTRACT

A method of secure booting of an SMP architecture apparatus provides for the formation of a secure domain comprising a first processor and a part of a shared memory, before the booting of the operating system of the first processor. The operating system of a second processor is booted only after the reciprocal authentication with the first processor and, in case of authentication, the extension of the secure domain to the second processor.

31 Claims, 3 Drawing Sheets

U.S. PATENT DOCUMENTS

| | | | | |
|---|---|---|---|---|
| 6,633,979 | B1* | 10/2003 | Smeets | 713/151 |
| 6,688,520 | B2* | 2/2004 | Maruyama | 235/449 |
| 6,747,546 | B1* | 6/2004 | Hikita et al. | 340/10.31 |
| 6,813,522 | B1* | 11/2004 | Schwarm et al. | 700/5 |
| 6,928,539 | B2* | 8/2005 | Brassac et al. | 713/1 |
| 6,983,366 | B1* | 1/2006 | Huynh et al. | 713/168 |
| 7,024,555 | B2* | 4/2006 | Kozuch et al. | 726/22 |
| 7,228,430 | B2* | 6/2007 | Benayoun et al. | 713/182 |
| 2003/0074548 | A1 | 4/2003 | Cromer et al. | |
| 2003/0084346 | A1 | 5/2003 | Kozuch et al. | |

FOREIGN PATENT DOCUMENTS

| | | |
|---|---|---|
| GB | 2281991 | 3/1995 |

OTHER PUBLICATIONS

Needham et al., "Using Encryption for Authentication in Large Networks of Computers," Communications of the ACM, 21(12):993-999, Dec. 1978.

* cited by examiner

SECURE BOOTING OF AN ELECTRONIC APPARATUS WITH SMP ARCHITECTURE

BACKGROUND OF THE INVENTION

1. Field of the Invention

The present invention relates generally to the security of an electronic apparatus.

2. Description of the Related Art

It finds applications, in particular, in an electronic apparatus having an architecture with several symmetric processors and with shared memory, which is external to the processors linked together by at least one communication bus. Such an architecture is known by the term SMP architecture (standing for "Symmetric Multi-Processor").

Security designates the aspects of countering the hacking of an apparatus, such as by introducing a hack circuit or in running a hack code (program) in the apparatus.

The electronic apparatus aimed at here is a unitary hardwired apparatus, that is to say formed of an assembly of elements (microprocessors, peripheral controllers, network cards, memories, etc.) of components with a certain physical and functional unity, for example a general purpose computer, a decoder box or "Set-Top Box", a personal digital assistant or PDA, a portable telephone, or other portable wireless products, etc. In distributed systems, such as complex computing systems comprising several machines (computers, servers, routers, etc.) networked together or linked via the Internet, specific security techniques may be implemented. Likewise, in systems integrated entirely onto silicon or SoC systems (standing for "System-on-Chip"), security is generally ensured mechanically by sealing (or encapsulation) in a plastic or ceramic package.

It is known that the security of an electronic apparatus may be managed, in the first place during the booting of the apparatus. One then speaks of secure booting of the apparatus.

According to a first technique, the so-called incremental secure boot technique, the integrity of each hardware element and of each software element is checked before booting thereof that is to say, respectively before enabling thereof or execution thereof. Stated otherwise, the activation of each element of the apparatus is preceded by a procedure of validation of integrity and/or of authentication of the said element. The element can then be used with confidence by the other elements, that is to say as an element regarded as reliable from a security point of view ("trustworthy"). The operation of each element thus relies on elements regarded as reliable forming a secure domain inside the apparatus. If the integrity of an element is not validated or if authentication thereof fails, this element is not booted. As a result of this, a service or a function of the apparatus may not be assured. U.S. Pat. No. 6,263,431 illustrates this technique.

A second technique, the so-called secure boot tracking technique, is distinguished from the previous one in that it does not invoke the bootstrap process. Instead, it makes provision to monitor and to keep an audit trail of every software element that has been booted in the apparatus. One can subsequently determine whether such an element has been booted securely by consulting a bootup log which has been recorded. Thus, the applications executing in the apparatus can detect whether the elements have been booted securely and whether consequently they can share sensitive data with them completely securely. US Patent Application 2003/0074548 may be cited by way of prior art illustrating this technique.

In an SMP architecture apparatus, a plurality of processors are connected to a shared memory, via a communication bus or any similar interconnection device ("crossbar" or the like). As far as booting is concerned, the fundamental difference with a single-processor apparatus, is that the codes of the OSs executing respectively in each processor have at a certain level to synchronize their boot procedure.

With the Pentium® and Itanium® processors from Intel Corporation, all the processors of the apparatus are powered-up at the same time when the apparatus is powered-up. After carrying out an automatic power-up test or POST ("Power-on Self Test") and the booting of certain internal hardware elements, the processors synchronize themselves by using the memory bus so that a specified processor, called the bootstrap processor or BSP continues the booting of its OS while the other processors, called application processors or APs, stand by awaiting the receipt of a boot signal or handshake signal in order to continue their boot procedure. This boot signal is typically triggered by an OS boot code (or "OS startup code") of the BSP after the initialization of the processor tables that are required by the OS (e.g., the interrupt tables and the pages of memory tables for enabling the virtual memory). With this boot signal, a memory address is sent, which indicates a page of the shared memory from which the APs are supposed to resume their boot procedure.

A similar protocol is disclosed in U.S. Pat. No. 6,012,142, which provides furthermore for a signal to be sent from processor to processor to signal to them that it is their turn to boot.

Other approaches have been proposed in U.S. Pat. Nos. 6,400,717 and 6,347,372, which both provide for the addition to the system of a dedicated circuit, which provides the processors with a boot signal individually and one at a time. In addition to that, the above-cited U.S. Pat. No. 6,347,372 reserves the memory bus for the processor that is currently booting, so as to speed up the boot procedure.

BRIEF SUMMARY OF THE INVENTION

An embodiment of the invention proposes an alternative to the boot procedures presented above.

One embodiment of the invention proposes a method of secure booting of an electronic apparatus comprising several processors and an external shared memory that are linked by at least one communication bus, each processor having hardware elements and a stack of software elements that can execute on said hardware elements. The process comprises:

a) the secure booting of a first of said processors, up to but not including a software element corresponding to an operating system;

b) the protection, by said first processor, of a part of the shared memory, in such a way as to form a secure domain consisting of said first processor and of said protected part of the shared memory;

c) the booting of the operating system of said first processor, with storage of data of said operating system in said protected part of the shared memory;

d) the secure booting of a second of said processors, up to but not including a software element corresponding to an operating system; then e) the authentication of the second processor with the first processor and vice versa, and, in case of successful authentications, f) the extension of the secure domain to said second processor, through the provision by said first processor to said second processor, of a write-access entitlement to said protected part of the shared memory; then g) the booting of the operating system of said second processor, with storage of data of said operating system in said protected part of the shared memory.

In one mode of implementation, the reciprocal authentication of the first processor and of the second processor is carried out by a software element of the first processor corresponding to an authentication manager.

The first processor can be selected from among the processors of the apparatus, by a software element corresponding to a boot code which is loaded into an internal RAM of the processors from an external ROM.

In particular in the case of processors from Intel Corporation, the processors other than the first processor can interrupt their boot sequence before the booting of their operating system, until the reception of a boot signal which is emitted by the first processor only after the installation of the software element corresponding to the authentication manager, then resume their boot sequence, preferably from the place at which it was halted.

In an exemplary implementation of the method according to the invention, the code corresponding to the authentication manager implements an asymmetric authentication algorithm.

Moreover, the protection of the part of the shared memory can be performed by a software element of the first processor, corresponding for example to a code for booting an operating system, by assigning the write-access entitlement to the protected part of the shared memory and the entitlement of modification of the access entitlements to the shared memory exclusively to the said first processor, and by preferably assigning the write-access entitlement to the whole of the shared memory to all the processors.

In particular for the processors from Intel Corporation, step a) and step d) can be performed substantially in parallel.

As a variant, step d) begins only after step c), that is to say only after the end of the booting of the first processor.

In particular, in step c) and/or step g), the data stored in the protected part of the shared memory comprise processor tables used by the operating system, respectively of the first processor and of the second processor.

A second embodiment of the invention proposes a processor comprising means for the implementation of a method according to the first embodiment as defined hereinabove.

A third embodiment of the invention relates to an electronic apparatus comprising a plurality of processors according to the second embodiment, linked to a shared memory by at least one communication bus. Examples of such apparatus were given in the introduction.

An electronic apparatus comprises a shared memory; a communication bus; and a plurality of processors coupled to the shared memory by the communication bus, the plurality of processors including first and second processors. The first processor includes: means for securely booting the first processor without booting a software element corresponding to an operating system; means for protecting a part of the shared memory in such a way as to form a secure domain that includes the first processor and the protected part of the shared memory; means for booting the operating system of the first processor, including storing data of the operating system in the protected part of the shared memory; means for authenticating the second processor; and means for extending the secure domain to the second processor if the second processor is successfully authenticated, wherein the first processor provides to the second processor a write-access entitlement to the protected part of the shared memory. The second processor includes: means for securely booting the second processor without booting a software element corresponding to an operating system of the second processor; means for authenticating the first processor, wherein the means for extending the secure domain to the second processor operates in response to successful authentication of the first and second processors; and means for booting the operating system of the second processor, including storing data of said operating system of the second processor in the protected part of the shared memory.

A method securely boots an electronic apparatus including first and second processors. The method includes: booting a portion of the second processor that does not include an operating system of the second processor; authenticating the second processor using the first processor; and authenticating the first processor using the second processor. If both of the first and second processors are successfully authenticated, then: providing from the first processor to the second processor access to a protected memory portion of a shared memory; and booting the operating system of the second processor, including storing data used by the operating system in the protected memory portion.

BRIEF DESCRIPTION OF THE SEVERAL VIEWS OF THE DRAWINGS

Other characteristics and advantages of the invention will become further apparent on reading the description which follows. The latter is purely illustrative and should be read in conjunction with the appended drawings in which.

DETAILED DESCRIPTION OF THE INVENTION

Figure 1:
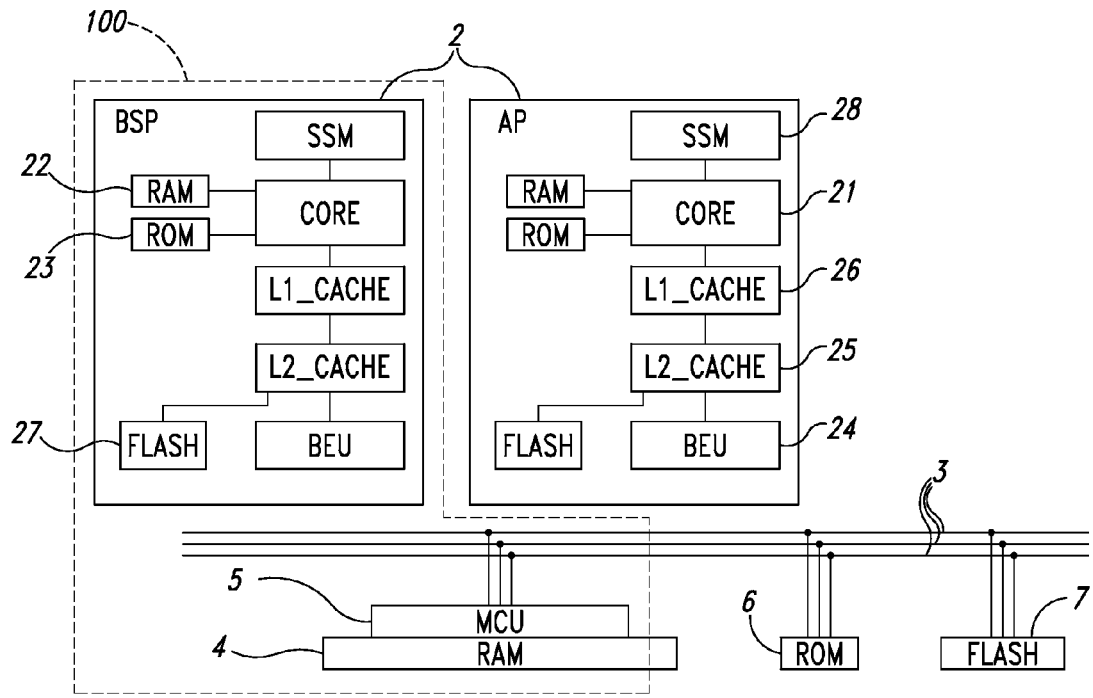
FIG. 1 is a block diagram illustrating an exemplary SMP architecture electronic apparatus to which the present invention may be applied.

FIG. 1 shows an exemplary electronic apparatus to which the method according to the present invention may be applied.

The apparatus comprises at least two processors 2 which are structurally identical, and which are linked by way of at least one communication bus 3. A main memory 4 is also linked to the bus 3 by way of a unit for controlling access to the memory or MCU (standing for "Memory Control Unit"). The memory 4 is a volatile random access memory or RAM. The memory 4 is said to be external in the sense that it is external to the processors 2. Moreover, it is said to be shared in the sense that it is intended to be read-accessed and/or write-accessed by certain or all of the processors 2. The management of the entitlement of write-access or the entitlement of read-access to the memory 4 is performed by virtue of the MCU 5. The architecture described above is said to be SMP in the meaning that the electronic apparatus comprises several processors and a shared memory 4, external to the processors, that are linked together by the bus or buses 3.

An external read-only memory 6 or ROM is also linked to the buses 3 and can be read by the processors 2.

Another nonvolatile memory, namely a flash memory 7, is also linked to the buses 3. It is for example a EEPROM flash memory. It contains, as the case may be, an update of the boot codes for the processors.

The processors each exhibit the same structure, that is to say the same hardware elements, although one of the processors, called the boot processor, plays a particular role during the booting of the apparatus as will be seen later. The principal hardware elements included in each processor will now be described.

A processor 2 firstly includes a processor core 21. It also includes an internal RAM 22 in which are loaded the software elements executed by the processor before a protection of the shared memory 4 is effected. This internal RAM 22 is accessible only by the core 21. In particular, it is not linked to a memory bus or to a cache memory. It follows that it is protected against the known hardware attacks that are easiest to implement (for example by bus "eavesdropping"). In this meaning, the internal RAM 22 is said to be secure.

The same holds for an internal ROM 23 of the processor 2, which contains the "root of trust" of the apparatus. This ROM actually contains a code whose function is to authenticate the first boot code read by the processor from the external ROM 6. The integrity of the internal ROM 23 can be validated during the booting of the processor by a BIST functionality (standing for "Built-in-Self-Test").

The protection of the internal RAM 22 and of the internal ROM 23 may moreover be strengthened by additional means for avoiding hardware attacks, for example by encapsulation in a ceramic package.

Each processor furthermore comprises a bus encryption or enciphering unit 24 or BEU (standing for "Bus Encryption Unit"). The unit 24 links the processor to the buses 3. In particular, it is linked to the core 21 via a second-level cache memory 25 and a first-level cache memory 26. The unit 24 has as function to encrypt all the data that are placed by the processor on the bus 3, in particular the data to be written to the external memory 4, and to decrypt these data when they are read again from the external memory 4 so as to be delivered to the processor core 21 via the cache memories 25 and 26. To provide for these encryption and decryption functions, the unit 24 uses a key referred to subsequently as the BEU key.

Each processor 2 also comprises another internal read-only memory 27, for example an EEPROM flash memory. The memory 27 has as aim to store, as the case may be, parameters individual to each processor, according to the requirements of the application. The memory 27 is linked to the processor core 21 via the cache memories 25 and 26.

Finally, each processor includes a security state machine 28 or SSM. The machine 28 has as function to protect the secure mode of the processor, and in particular to protect the internal RAM 22 against any hacking attempts. For this purpose, the machine 28 monitors the input of any code sequence destined for the internal RAM 22, and makes sure that a code whose integrity is not validated is not capable of modifying the content of the internal RAM 22. Since any code which is loaded into the internal RAM 22 has to be authenticated beforehand, the state machine 28 also has as function to record a bootup log and to authenticate this bootup log with the other processors on request.

Figure 2:
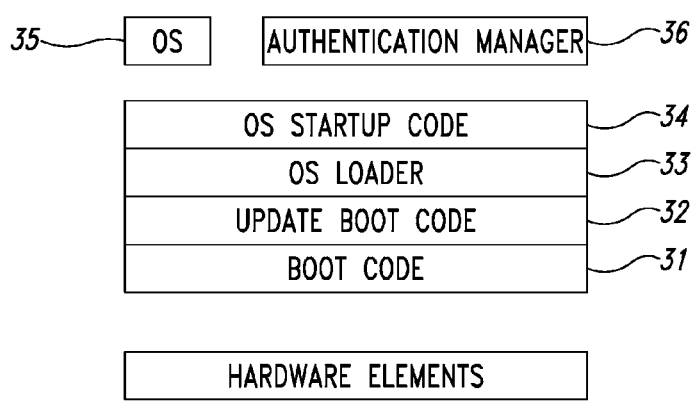
FIG. 2 is a diagrammatic representation of an exemplary stack of software elements that can execute in an electronic apparatus.

FIG. 2 illustrates an exemplary stack of software elements or software layers that can be processed by the hardware elements of each processor that have been presented hereinabove.

A first software element 31 is a boot code which is read from the external ROM 6 and which is authenticated by the internal ROM 23 before being loaded into the internal RAM 22 for execution by the processor core 21. The code 31 relies on the hardware elements of the processor 2.

Above the boot code 31 is a second software element 32 corresponding, as the case may be, to an update of the boot code. The update 32 is read from the external flash memory 7 by the processor core 21 through the BEU 24 and the cache memories 25-26, and is loaded into the internal RAM 22. Above the software element 32 is executed a third software element 33 called the operating system loader or more simply the OS loader. This code has as function, when it is loaded into the internal RAM 22 and executed by the processor core 21, to invoke the loading into the memory 22 of a fourth software element 34, namely an operating system startup code or more simply an OS startup code.

For its part, the code 34 has as main function to boot the OS of the processor and beforehand to initialize the processor tables such as the memory page tables, the interrupt vector table, etc. In one mode of implementation of the invention, other functions are allocated to the OS startup code 34, as will be made explicit later.

The OS of the processor is a fifth software element 35 which executes above the previous element 34. The same holds for another software element 36 which is a particular code deploying an authentication manager. The authentication manager 36 has as function, when it is installed by the OS startup code 34 in the external RAM memory 4 and executed by the processor core 21, to manage the authentication of the processors vis-à-vis one another.

The software elements 31 to 36 are booted according to an incremental secure boot method, insofar as they are each booted by the subjacent element in the stack once the latter has validated their integrity or has authenticated them. This method will now be described in detail with regard to the step chart of FIG. 3.

It may be noted that, in one mode of implementation, the elements 31-34 and 36 form the subject of a recording in the bootup log which is kept up-to-date by the state machine 28.

Figure 3A:
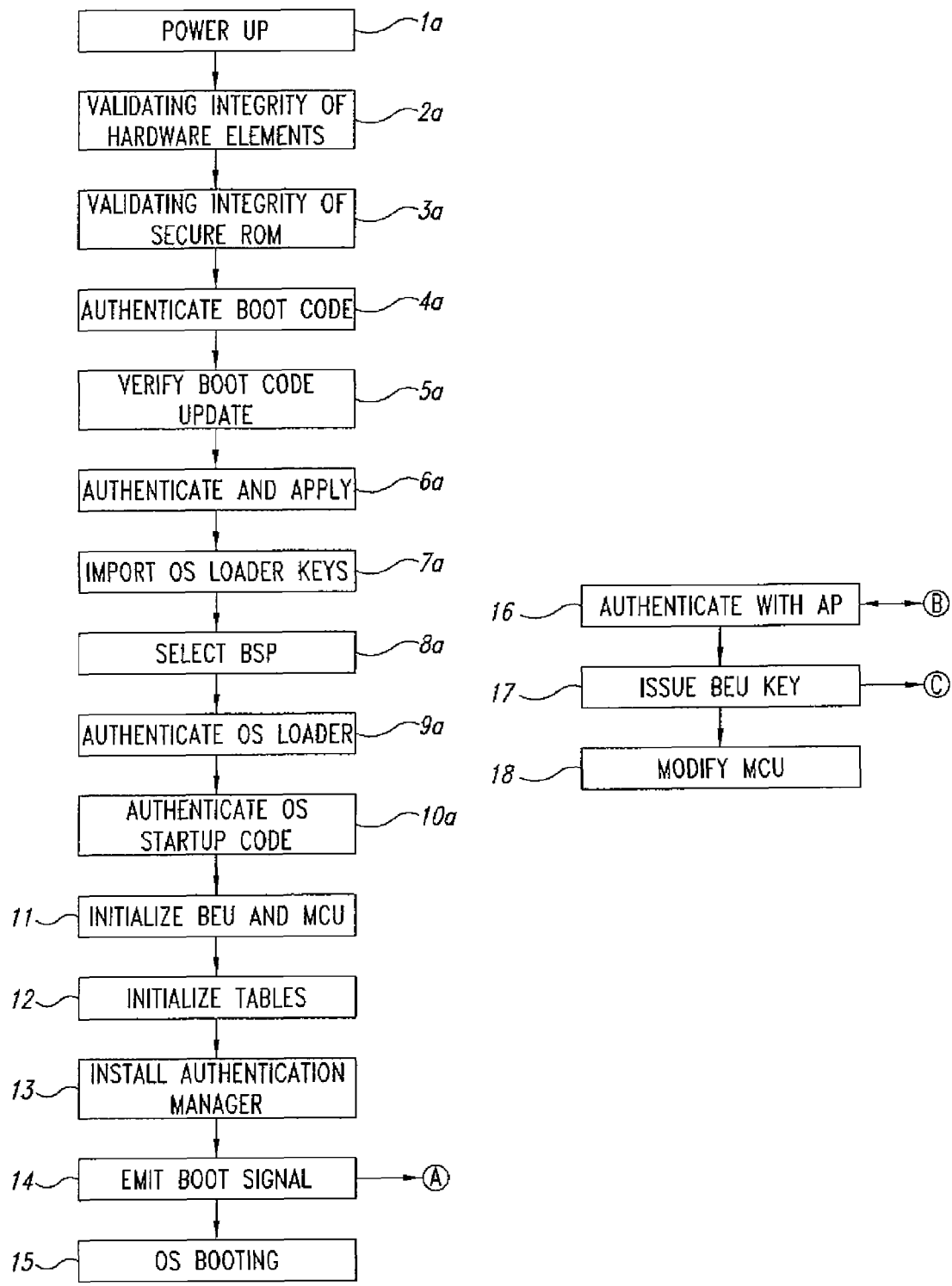
FIGS. 3A-3B are charts of steps illustrating the steps of an exemplary method of booting according to the invention.
Figure 3B:
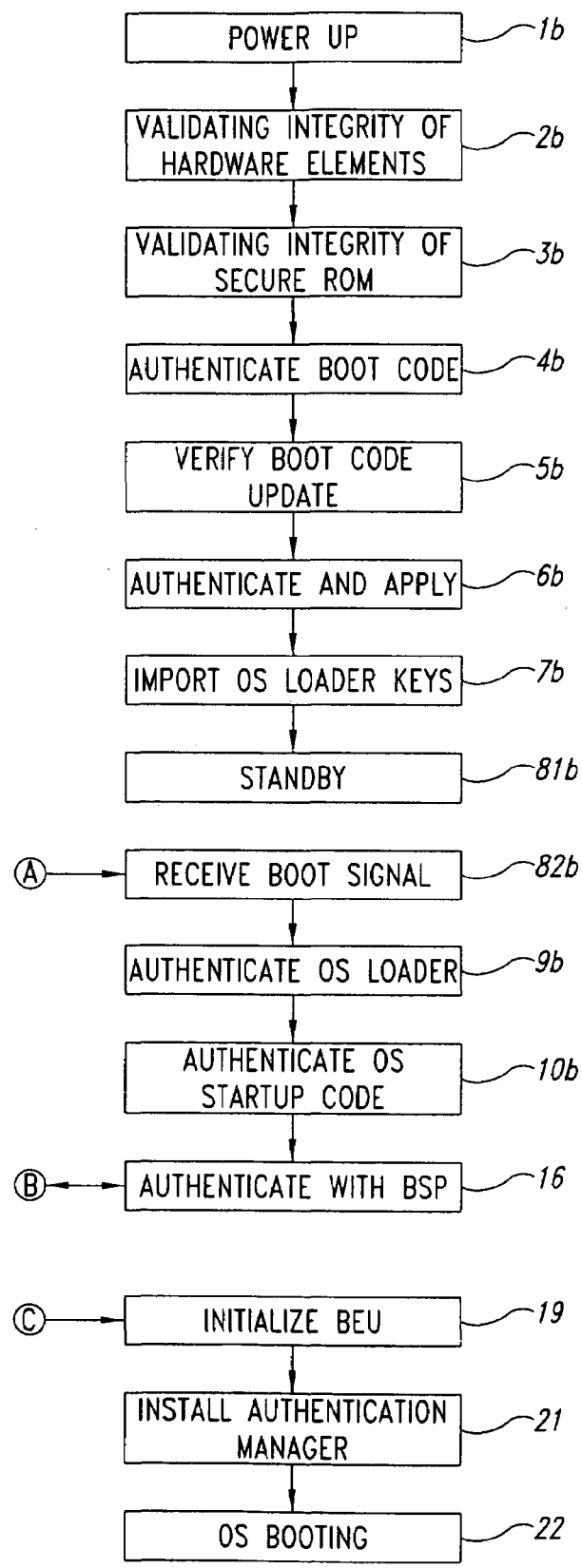

Diagrammatically illustrated in FIGS. 3A and 3B are the steps of an exemplary boot method according to the invention which are implemented in a first processor, called the bootstrap processor or BSP (FIG. 3A), and in a second processor called the application processor or AP (FIG. 3B). Certain steps are identical for the BSP and the AP so that they are designated by a reference consisting of one and the same number followed respectively by the letter "a" for the BSP and by the letter "b" for the AP for example after power-up of the apparatus.

Thus, in a first step 1a or 1b, the processors 2 are powered-up.

In a second step 2a or 2b, an automatic power-up test or POST (standing for "Power-on Self Test") is implemented, having as function to validate the integrity of the hardware elements of the processors.

In a third step 3a or 3b, the integrity of the internal ROM 23 of the processors is validated by means of a BIST functionality.

In a fourth step 4a or 4b, the internal ROM 23 authenticates the boot code 31 which is read from the external ROM 6. In case of successful authentication, the boot code is loaded into the internal RAM 22 to be executed by the processor core 21.

In a fifth step 5a or 5b, the boot code 31 checks the possible presence of an update of the boot code 32 in the external flash memory 7. If the check is verified, the boot code 31 authenticates the update 32 and applies it by updating the content of the internal RAM 22 in a step 6a or 6b.

In a seventh step 7a or 7b, the boot code 31, possibly updated as indicated above, imports the keys of the OS loader.

The first seven steps above are identical to those implemented during the booting of an electronic apparatus comprising a single processor. Steps 1a-7a on the one hand, and 1b-7b on the other hand may be implemented almost simultaneously, that is to say substantially in parallel, respectively for the BSP and for the AP, or not.

For certain other processors, for example the processors from Intel Corporation such as the Pentium® or Itanium®, that one of the processors 2 of the electronic apparatus which is operating as BSP is not determined in advance. This is why the boot code 31 of one of the processors 2 of the electronic apparatus selects the processor in a step 8a so that it becomes the BSP. The BSP can then continue its boot procedure, while the other processor or processors, namely the AP or APs, enter a standby phase 81b.

In a step 9a, the boot code 31 of the BSP authenticates the OS loader 33.

In case of successful authentication, the OS loader 33 of the BSP is loaded into the internal RAM 22 and executed by the core 21. It authenticates, in a step 10a, the OS startup code 34 of the BSP.

Steps 9a and 10a have a counterpart on the APs side, as will be seen later, but these corresponding steps 9b and 10b are implemented in an AP after the latter has received a boot signal or handshake signal. Once again concerning the BSP, and in case of successful authentication of the OS startup code in step 10a, the said code is loaded into the internal RAM 22 and executed in the core 21.

It performs, in a step 11, the initialization of the MCU. This step 11 has as function to protect a part of the external RAM 4. This protection takes place while configuring the MCU so as to give the BSP an exclusive entitlement to write to the protected part of the external RAM 4. The write-access entitlement to the protected part of the external RAM 4 may be given to all the processors, that is to say the BSP and to the APs. Furthermore, the MCU is also configured so that exclusivity of the entitlement of modification of the access entitlements to the protected part of the external RAM 4 is reserved for the BSP. The dimensions (limits) of the protected part of the external RAM 4 are also defined by configuration of the MCU. Protection of the external RAM 4 may be implemented with the aid of an appropriate mask ("wildcard mask").

The hardware and software elements of the BSP which are already booted as well as the protected part of the external RAM 4 then form a secure domain 100 of the apparatus. This domain is represented with dashes in the diagram of FIG. 1. The remainder of the external RAM 4, that is to say the memory space (not protected in step 11) which does not belong to the secure domain 100, remains available for non-secure communication between the BSP and the APs, or between the APs.

In an advantageous mode of implementation, step 11 also comprises the initialization and the activation of the BEU of the BSP, in such a way as to implement the encryption of the data exchanged between the BSP and the external memory 4 via the communication buses 3.

In a next step 12, the OS startup code 34 of the BSP initializes the processor tables in the protected part of the external RAM 4. These tables comprise in particular the table of memory pages and the table of interrupt vectors which will be used via the OS of the BSP. Stated otherwise, data of the OS of the BSP are loaded into the protected part of the external RAM 4.

Thereafter, the OS 35 of the BSP can be booted, this occurring in a step 15. In the mode of implementation represented in FIGS. 3A and 3B, a code corresponding to the authentication manager 36 is previously installed in the protected part of the external RAM 4 by the OS startup code 34 in step 13, so as to allow the authentication of the other APs. The authentication manager scans through the authentication requests issued by the APs.

Moreover, in a step 14, the OS startup code 34 of the BSP emits a boot signal destined for another processor, namely the AP whose booting is illustrated by the steps represented in FIG. 3B.

It will be noted that the order of steps 13, 14, 15 may be shuffled if step 13 is implemented after step 11 and if step 15 is implemented after steps 11 and 12. It is envisaged in the example considered here that the boot signal is emitted by the OS startup code in step 14, but it would also be possible to envisage it being emitted by the OS itself after it has been booted.

After the AP has received the boot signal in step 82b, it performs steps 9b and 10b already commented on above. It will be noted that, with processors from Intel Corporation such as Pentium® or Itanium®, the booting of the APs resumes only from an address in the shared memory (transmitted with the boot signal) which points into the secure part.

Thereafter, in a step 16, the BSP authenticates itself with the AP and, reciprocally, the AP authenticates itself with the BSP. This mutual authentication step is managed by the authentication manager 36 of the BSP. They can implement an asymmetric authentication algorithm, known per se. For each authentication request (i.e., request of authentication of the AP by the BSP and request of authentication of the BSP emitted by the AP), the authentication pertains to the processor itself, to the bootup log generated by the SSM of the processor, and to the code which produced the authentication request.

In case of successful authentication, the BSP issues its BEU key to the AP in a step 17. In a step 19, the AP then initializes its BEU with the key thus received. In this way, it is ensured that the BSP and the BEU can exchange data by reading from and writing to the external RAM 4. Step 17 is also implemented under the control of the authentication manager 36 of the BSP.

The entitlements of access to the protected part of the external RAM 4 are modified, through an appropriate reconfiguration 18_of the MCU. Step 18 is likewise implemented by the authentication manager 36 of the BSP.

Thereafter, the AP proceeds to the installation 21 of an instance of the authentication manager 36, so as to be able in its turn to authenticate other processors, as the case may be. Thus, the BSP or the AP can thereafter insert other processors (that is to say other APs) into the secure domain of the apparatus.

Finally, in a step 22, the OS startup code of the AP starts up the OS of the AP. Step 22 comprises the initialization in the secure part of the external RAM 4 of the processor tables used by the OS of the AP. Stated otherwise, the data of the OS are stored in the protected part of the shared memory 4.

The invention has been described hereinabove in a preferred but nonlimiting mode of implementation. In particular, the selection of the BSP in step 8a, the standing by of the AP in step 81b and the emission of the boot signal by the BSP in step 14 are useful when the processors are Intel Corporation processors such as Pentium® and Itanium®. It will further be noted that the resume address that can be used to indicate the code to be used to complete the booting of the OS of the AP in step 22, is preferably emitted not with the boot signal in step 14, but after step 18 at which the AP enters the secure domain. In this way the resume address is transmitted via the external RAM 4 in a secure manner, and cannot therefore be modified during its transmission in order to make the booting of the AP resume from another address, into which a hacking code may have been introduced.

With processors other than those mentioned above from Intel Corporation, steps 8a, 81b and 14 can be skipped.

The invention can also be applied to a boot procedure such as those described in U.S. Pat. Nos. 6,347,372 and 6,400,717 presented in the introduction. In this case, the AP begins its boot sequence with the first step 1b executed after the last step 18 of the BSP boot sequence. Moreover, steps 8a, 81b and 14 are skipped. The AP can continue its boot sequence directly and can authenticate itself with the authentication manager of the BSP which has been installed during the secure boot of the BSP.

It will further be noted that a secure boot as defined in the above paragraph applies also should a processor be added while operational ("hot plugging") into the apparatus when it is already booted. In this case, the already booted processors are already operating while the added processor is booted. The latter can then also skip step 81*b* and does not need receipt of the boot signal.

The invention claimed is:

1. A method of secure booting of an electronic apparatus that includes plural processors and an external shared memory that are linked by at least one communication bus, each processor having hardware elements and a stack of software elements that can execute on said hardware elements, the method comprising:
 a) securely booting of a first of said processors, up to but not including a software element corresponding to an operating system;
 b) protecting, by said first processor, a part of the shared memory, in such a way as to form a secure domain that includes said first processor and of said protected part of the shared memory;
 c) booting the operating system of said first processor, including storing data of said operating system in said protected part of the shared memory;
 d) securely booting a second of said processors, up to but not including a software element corresponding to an operating system; then
 e) authenticating the second processor with the first processor and vice versa, and, in case of successful authentications,
 f) extending the secure domain to the second processor, wherein said first processor provides to said second processor, a write-access entitlement to said protected part of the shared memory; then
 g) booting the operating system of said second processor, including storing data of said operating system of the second processor in said protected part of the shared memory.

2. The method according to claim 1, wherein the authenticating of the first processor and of the second processor is controlled by a software element of the first processor corresponding to an authentication manager.

3. The method according to claim 2, wherein the software element corresponding to the authentication manager implements a public key and private key authentication algorithm.

4. The method according to claim 1, wherein the first processor is selected from among the processors of the apparatus, by a software element corresponding to a boot code which is loaded into an internal RAM of the processors from an external ROM.

5. The method according to claim 4, wherein the authenticating of the first processor and of the second processor is controlled by a software element of the first processor corresponding to an authentication manager and wherein the processors other than the first processor interrupt their boot sequence before the booting of their operating system, until the reception from the first processor of a boot signal which is emitted by the first processor only after the installation of the software element corresponding to the authentication manager, then resume their boot sequence.

6. The method according to claim 1, wherein the protecting of the part of the shared memory is performed by a software element of the first processor, by assigning a write-access entitlement to the protected part of the shared memory and an entitlement of modification of the access entitlements to the shared memory exclusively to the first processor.

7. The method according to claim 1, wherein step a) and step d) are performed substantially in parallel.

8. The method according to claim 1, wherein step d) begins only after step c).

9. The method according to claim 1, wherein, the data stored by step c) include processor tables used by the operating system of the first processor and the data stored by step g) include processor tables used by the operating system of the second processor.

10. An electronic apparatus, comprising:
 a shared memory;
 a communication bus; and
 a plurality of processors coupled to the shared memory by the communication bus, the plurality of processors including first and second processors, wherein the first processor includes:
  means for securely booting the first processor without booting a software element corresponding to an operating system;
  means for protecting a part of the shared memory in such a way as to form a secure domain that includes the first processor and the protected part of the shared memory;
  means for booting the operating system of the first processor, including storing data of the operating system in the protected part of the shared memory;
  means for authenticating the second processor; and
  means for extending the secure domain to the second processor if the second processor is successfully authenticated, wherein the first processor provides to the second processor a write-access entitlement to the protected part of the shared memory,
 wherein the second processor includes:
  means for securely booting the second processor without booting a software element corresponding to an operating system of the second processor;
  means for authenticating the first processor, wherein the means for extending the secure domain to the second processor operates in response to successful authentication of the first and second processors; and
  means for booting the operating system of the second processor, including storing data of said operating system of the second processor in the protected part of the shared memory.

11. The apparatus of claim 10, wherein the means for authenticating the second processor includes a software element of the first processor corresponding to an authentication manager.

12. The apparatus of claim 11, wherein the software element corresponding to the authentication manager is structured to implement a public key and private key authentication algorithm.

13. The apparatus of claim 10, further comprising a ROM that includes a software element corresponding to a boot code that is structured to select the first processor from among the plurality of the processors.

14. The apparatus of claim 10, wherein the second processor includes means for interrupting the booting of the second processor until the reception from the first processor of a boot signal that is emitted by the first processor only after an authentication manager of the first processor is installed.

15. A method of secure booting of an electronic apparatus that includes first and second processors, comprising:
 booting a portion of the second processor that does not include an operating system of the second processor;

authenticating the second processor using the first processor;

authenticating the first processor using the second processor;

if both of the first and second processors are successfully authenticated, then:

providing from the first processor to the second processor access to a protected memory portion of a shared memory; and booting the operating system of the second processor, including storing data used by the operating system in the protected memory portion.

16. The method of claim 15, further comprising:

protecting, by the first processor, the protected memory portion of the shared memory, in such a way as to form a secure domain that includes the first processor and the protected memory portion of the shared memory.

17. The method of claim 16, further comprising:

securely booting the first processor without booting a software element corresponding to an operating system of the first processor, before protecting the protected memory portion; and booting the software element corresponding to the operating system of the first processor after protecting the protected memory portion, including storing data of the operating system in the protected memory portion of the shared memory.

18. The method of claim 16, wherein the protecting step is performed by assigning exclusively to the first processor a write-access entitlement to the protected memory portion and an entitlement of modification of the access entitlements to the shared memory.

19. The method of claim 15, wherein the authenticating of the first processor and of the second processor is controlled by a software element of the first processor corresponding to an authentication manager.

20. The method of claim 15, wherein the software element corresponding to the authentication manager implements a public key and private key authentication algorithm.

21. The method of claim 15, wherein the first processor is selected from among a plurality of processors of the apparatus, by a software element corresponding to a boot code which is loaded into an internal RAM of the processors from a ROM that is external to the processors.

22. The method of claim 15, wherein the authenticating of the first processor and of the second processor is controlled by a software element of the first processor corresponding to an authentication manager and wherein the second processor interrupts its boot sequence before booting its operating system, until receiving from the first processor a boot signal that is emitted by the first processor only after the installation of the software element corresponding to the authentication manager, then resumes the boot sequence.

23. The method of claim 15, further comprising securely booting a portion of the first processor substantially in parallel with the step of booting a portion of the second processor.

24. The method of claim 15, further comprising securely booting the first processor and storing data in the protected memory portion before beginning the step of booting the portion of the second processor.

25. The method of claim 15, wherein, the data stored in the protected memory portion include processor tables used by the operating system of the second processor.

26. The method of claim 1, wherein step b) further includes initializing a first encryption unit of the first processor, the first encrtyption unit for encrypting data exchanged between the first processor and the protected part of the shared memory, the method further comprising:

after authenticating the second processor with the first processor and vice versa, and, in case of successful authentications, issuing by the first proccessor to the second processor an encryption key used by the first encryption unit; and initializing a second encyption unit of the second processor for encrypting data exchanged between the second processor and the protected part of the shared memory with the issued encyrption key.

27. The method of claim 1, wherein the securely booting of the first of said processors and the securely booting the second of said processors is implemented using at least one of an incremental secure boot method and a secure boot tracking method.

28. The electronic appartus of claim 10, wherein the first and second processors respectively include a first and second encryption unit, the first and second encryption unit configured to encrypt and decrypt data respectively written to and read from the shared memory, wherein the first processor further includes means for issuing to the second processor an encryption key used by the first encryption unit, in response to successful authentication of the first and second processors, and wherein the second processor includes means for initializing the second encryption unit with the encryption key.

29. The electronic apparatus of claim 10, where the means for securely booting the first processor and the means for securely booting the second processor include means for securely booting using at least one of an incremental secure boot method and a secure boot tracking method.

30. The method of claim 15, further comprising:

if both of the first and second processors are successfully authenticated, then:

issuing by the first processor to the second processor an encrytion key used by a first encrytion unit of the first processor, the first encryption unit for encrypting data exchanged between the first processor and the protected memory portion of a shared memory; and initializing a second encryption unit of the second processor with the issued encryption key, the second encryption unit for encrypting data exchanged between the second processor and the protected memory portion of a shared memory.

31. The method of claim 15, where the booting a portion of the second processor that does not include an operating system of the second processor includes securely booting the portion of the second processor using at least one of an incremental secure boot method and a secure boot tracking method.

* * * * *

UNITED STATES PATENT AND TRADEMARK OFFICE
CERTIFICATE OF CORRECTION

PATENT NO.      : 7,624,261 B2                                                Page 1 of 1
APPLICATION NO. : 11/432727
DATED           : November 24, 2009
INVENTOR(S)     : Marcus Volp It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Twenty-sixth Day of October, 2010

David J. Kappos
*Director of the United States Patent and Trademark Office*